Patented May 3, 1938

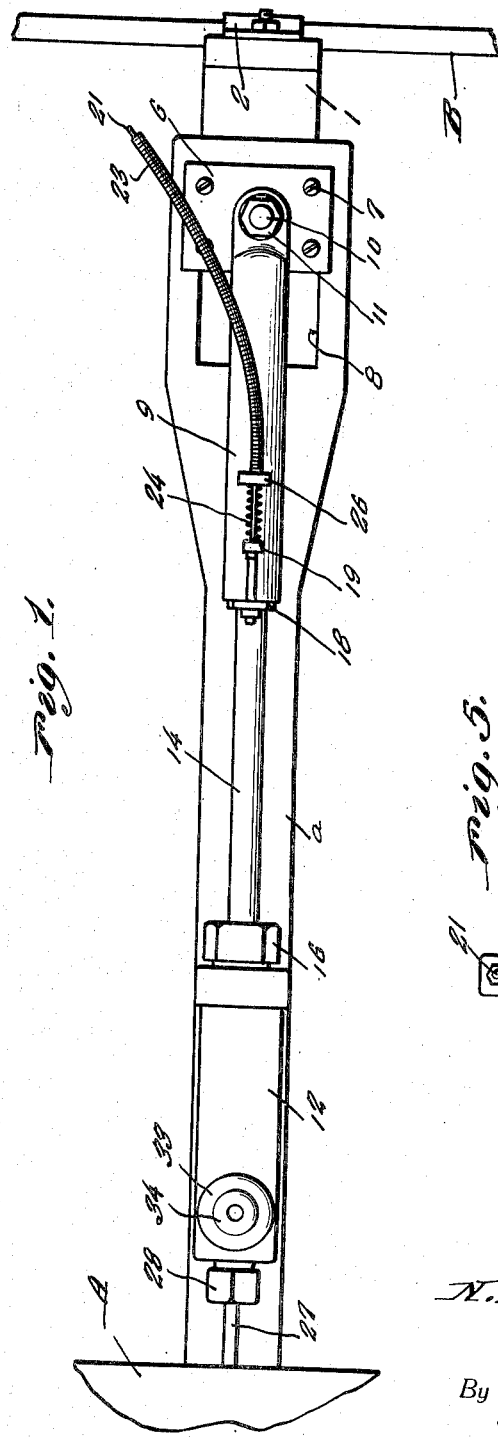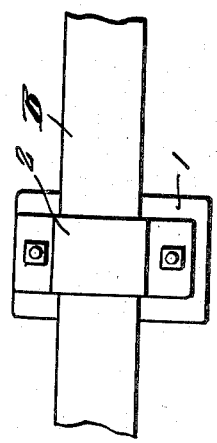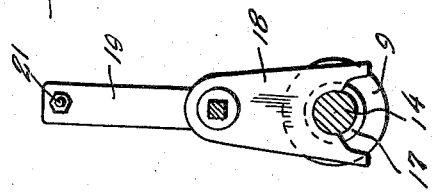

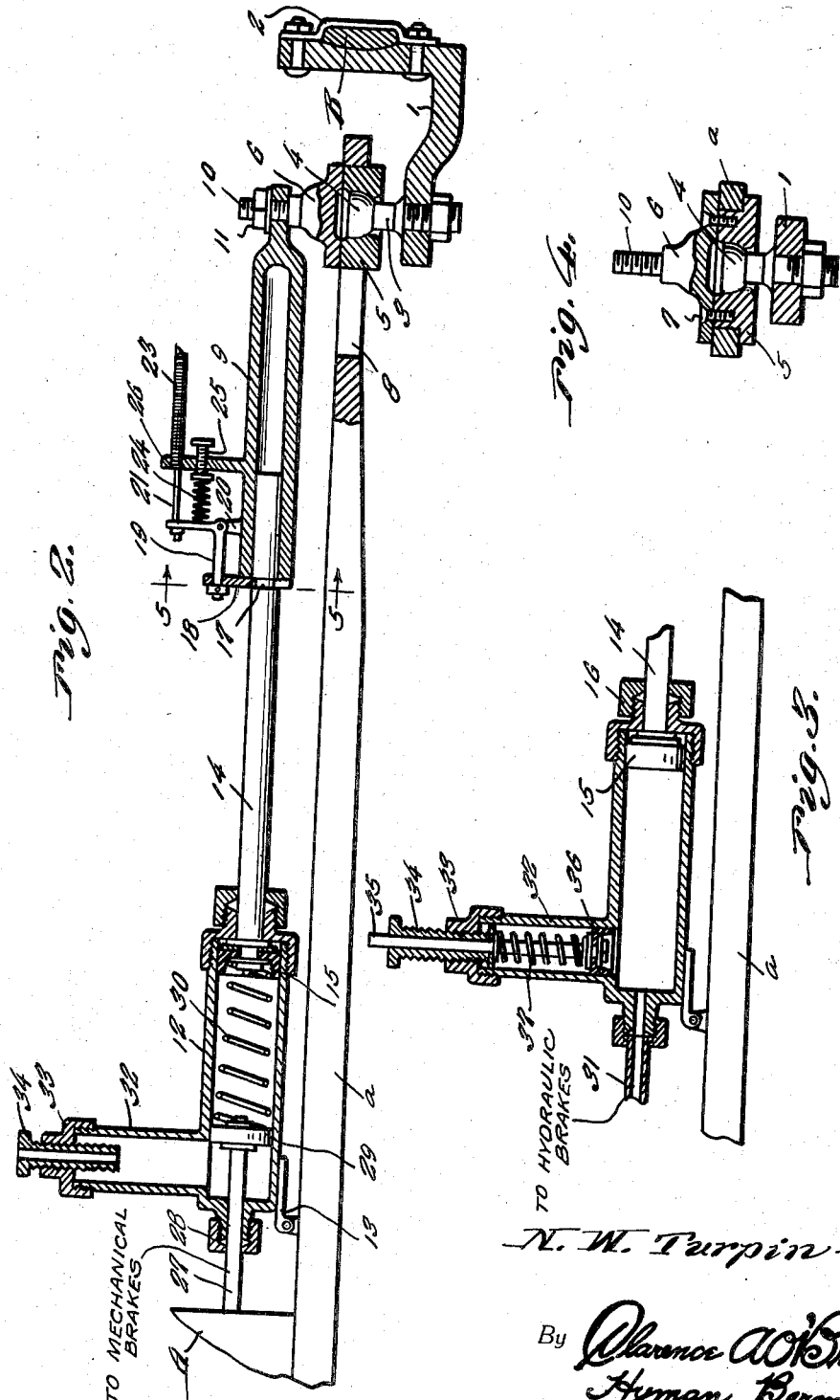

2,116,052

UNITED STATES PATENT OFFICE 2,116,052

COMBINED TRAILER COUPLING AND BRAKE

Norman W. Turpin, Hazleton, Pa.

Application September 21, 1937, Serial No. 164,960

7 Claims. (Cl. 188—142)

This invention relates to a hitch or coupling for connecting a trailer to a motor vehicle, the general object of the invention being to provide means whereby the trailer can readily follow the motor vehicle on turns, curves and straight away portions of the road, with means for applying the brakes of the trailer if the trailer should move toward the motor vehicle beyond a certain degree.

Another object of the invention is to provide means whereby the driver of the motor vehicle can readily release the brakes of the trailer whenever he desires, such, for instance, if he wishes to back the two vehicles.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a top plan view of the improved hitch or coupling.

Figure 2 is a longitudinal sectional view through Figure 1.

Figure 3 is a sectional view through the two cylinders and showing the arrangement when the invention is used with hydraulic brakes on the trailer.

Figure 4 is a sectional view through the swivel connection.

Figure 5 is a section on the line 5—5 of Figure 2.

Figure 6 is a view of the means for connecting the angle bracket to the bumper of the motor vehicle.

In these drawings, the letter A indicates a part of the trailer which is provided with a tongue $a$ and the letter B indicates the rear bumper of a motor vehicle. The numeral 1 indicates a substantially angle shaped bracket which has a concavity in the front face of its vertical part for receiving a portion of the rear face of the bumper B and said bracket is fastened to the bumper by means of a clamping plate 2 which passes over a portion of the bumper and is bolted to the bracket so that the bracket is fastened to the bumper of the motor vehicle.

A shank 3 is fastened to the rear end of the horizontal part of the bracket and extends upwardly and has a substantially semi-spherical head 4 which fits in a similar socket formed in a member 5 and its cap 6, the cap being fastened to the upper face of the member 5 by the screws or bolts 7. The member 5 and the cap form guideways at the sides of the parts for receiving the side walls of an elongated opening 8 in the front end of the tongue $a$ in which the members 5 and 6 are slidably arranged. Thus this member including the parts 5 and 6 has a swivel connection with the bracket 1 and has sliding movement relative to the front end of the tongue $a$.

An elongated tubular member 9 has a flat part provided with an opening at its front end which fits over an upright shank 10 connected with the top of the cap 6 and having its upper end threaded to receive a nut 11 which holds the tubular member on the shank and in a manner to pivotally connect the member 9 with the shank. A cylinder 12 is movably connected with the top of the tongue adjacent the rear end thereof by a pivoted member 13 and a rod 14 extends through the front end of the cylinder where it receives a piston member 15, said front end of the cylinder being provided with a packing gland 16 through which the rod passes. The front end of the rod 14 extends into the tubular member 9 and said rod has an annular groove 17 therein. This groove is normally exposed at the rear end of the member 9 and is engaged by the latch plate 18 having its lower end formed with a recess, the inner portion of which is of such shape as to have its wall fit in the upper portion of the groove and the lower part of the recess having its walls forming guideways for causing the plate to enter the groove upon downward movement of the plate. This plate is carried by a bellcrank 19 pivoted to an ear 20 on the member 9 and a flexible rod 21 connects the other end of the bellcrank lever with a button or the like in the motor vehicle adjacent the driver's seat so that the driver can by manipulating the rod 21 swing the bellcrank 19 upwardly to lift the latch plate 19 from out of the groove 17 which will permit relative sliding movement between the bar 14 and the member 9. A flexible casing 23 encloses the flexible rod 21 and a spring 24 tends to hold the bellcrank in lowered position with the latch plate engaging the groove and this spring can be adjusted by means of a screw member 25 passing through an upright 26 on the member 9, this member 26 also acting as a guiding means for the rod 21 and as a holding means for the flexible casing 23.

A rod 27 passes through the rear end of the cylinder 12 which is equipped with a gland 28 and the inner end of the rod has a piston member 29 attached thereto and a spring 30 lies between the piston members 15 and 29 within the cylinder. The rod 27 is connected with means for operating the brakes of the trailer, when such brakes are mechanical ones.

When the invention is used with hydraulic brakes on the trailer the rear end of the cylinder is connected by a conduit 31 with the hydraulic brakes and, of course, the cylinder contains fluid so that pressure on the fluid by the piston 15 will cause application of the brakes of the trailer. When the mechanical brakes are used the compression of the spring 30 by rearward movement of the rod 14 and its piston 15 will cause movement of the rod 27 and its piston 29 and such movement will apply in the mechanical brakes of the trailer.

An upright cylinder 32 is connected with the upper portion of the rear part of the cylinder 12 and the upper end of this cylinder 32 is closed by a cap 33 through which passes a threaded sleeve 34. A rod 35 is slidably arranged in the sleeve and extends into the cylinder 32 where it receives the piston member 36 and a spring 37 encircles that part of the rod within the cylinder 32 and acts to hold the piston 32 in lowered position. This arrangement is used when the trailer has hydraulic brakes, as shown in Figure 3 and the piston 36 with the associated parts acts as shock absorbing means to prevent the sudden application of the brakes when the trailer moves forwardly. When the invention is used with mechanical brakes then the rod 35, the piston 36 and the spring 37 can be removed and I contemplate making these parts of such a size that they can be used for the rod 27, the piston 29 and the spring 30.

From the foregoing it will be seen that when the invention is in use connecting a trailer with a motor vehicle, the pull of the vehicle will hold the member composed of the parts 5 and 6 in the front end of the slot 8 of the tongue so that there is no strain on the parts and due to the swivel connection the trailer can readily follow the motor vehicle around bends, curves and the like as well as on strightaway portions of the road.

If the trailer should move toward the motor vehicle for any reason, such as in going down a hill or upon sudden stoppage or checking of the motor vehicle, the tongue would slide forwardly with respect to the member composed of the parts 5 and 6 and as the rod 14 remains stationary the cylinder 12 would move forwardly on the rod so that the spring 30 would be compressed and this pressure acting against the piston 29 and the rod 27 would apply the mechanical brakes of the trailer. Of course, if hydraulic brakes were used the forward movement of the cylinder with respect to the piston 15 and rod 14 would cause compression of the fluid in the cylinder which would act on the hydraulic parts to apply the brakes of the trailer and thus check or stop the movement of the same.

As before stated the cylinder 32 and the parts associated therewith act as shock absorbing means.

If the trailer brakes have been applied and for any reason the driver of the motor vehicle wishes to back the vehicles so that it is necessary to release the brakes of the trailer all he has to do is to manipulate the button or other member connected with the rod 21 which will swing the bellcrank upwardly and thus pull the latch plate 18 out of engagement with the rod 14 and this will permit the spring 30 or the fluid in the cylinder to expand and thus permit the brakes to release so that the vehicles can be backed. Then upon slight forward movement of the motor vehicle the rod 14 will slide partly from the member 9 and this will permit the latch plate to engage the groove 17 through means of the spring 24.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:—

1. Means for connecting a trailer with a towing vehicle comprising a tongue connected with the trailer and having an elongated guide slot at its forward end, a member connected with the rear of the towing vehicle, a swivel connection between the tongue and said member and having a part slidably arranged in said slot, a pair of telescopic members one of which is connected with the member connected with the towing vehicle, means associated with the second telescopic member for applying the brakes of the trailer when the trailer moves toward the towing vehicle, latch means for preventing relative movement between the two telescopic members and manually operated means moving the latch means to releasing position from a point within the towing vehicle.

2. Means for coupling a trailer to a motor vehicle comprising a bracket connected with a rear part of the vehicle, a tongue connected with the trailer and having an elongated slot in its free end, a member slidably arranged in the slot, a swivel connection between the member and the bracket, a tubular member connected with the sliding member, a cylinder connected with the rear part of the tongue, a piston in the cylinder, a rod connected with the piston and passing through the front end of the cylinder into the tubular member and means for applying the brakes of the trailer by relative movement of the piston and cylinder.

3. Means for coupling a trailer to a motor vehicle comprising a bracket connected with a rear part of the vehicle, a tongue connected with a trailer and having an elongated slot in its free end, a member slidably arranged in the slot, a swivel connection between the member and the bracket, a tubular member connected with the sliding member, a cylinder connected with the rear part of the tongue, a piston in the cylinder, a rod connected with the piston and passing through the front end of the cylinder into the tubular member and means for applying the brakes of the trailer by relative movement of the piston and cylinder, said means including a spring in the cylinder and a member actuated by compression of the spring for applying the brakes.

4. Means for coupling a trailer to a motor vehicle comprising a bracket connected with a rear part of the vehicle, a tongue connected with the trailer and having an elongated slot in its free end, a member slidably arranged in the slot, a swivel connection between the member and the bracket, a tubular member connected with the sliding member, a cylinder connected with the rear part of the tongue, a piston in the cylinder, a rod connected with the piston and passing through the front end of the cylinder into the tubular member and means for applying the brakes of the trailer by relative movement of the piston and cylinder, said means including fluid in the cylinder compressed by the piston and actuating hydraulic brakes of the trailer.

5. Means for coupling a trailer to a motor vehicle comprising a bracket connected with a rear part of the vehicle, a tongue connected with the trailer and having an elongated slot in its free end, a member slidably arranged in the slot, a swivel connection between the member and the bracket, a tubular member connected with the sliding member, a cylinder connected with the rear part of the tongue, a piston in the cylinder, a rod connected with the piston and passing through the front end of the cylinder into the tubular member and means for applying the brakes of the trailer by relative movement of the piston and cylinder, said means including fluid in the cylinder compressed by the piston and actuating hydraulic brakes of the trailer, an upright cylinder connected with the rear end of the first-mentioned cylinder and a spring-pressed piston in the second cylinder and means for adjusting the tension of the spring.

6. A coupling for connecting a trailer with a motor vehicle comprising a tongue connected with the trailer, a bracket connected with the rear part of the motor vehicle, the front end of the tongue having an elongated slot therein, a member slidably arranged in the slot, a swivel connection between the member and the bracket, a tubular member pivoted to the sliding member at the front end of said tubular member, a rod extending into the tubular member, means actuated by the rod for applying the brakes of the trailer if the trailer moves toward the motor vehicle, a latch member for preventing relative movement of the rod and the tubular member, means for releasing the latch member from a point within the motor vehicle and spring means for normally holding the latch member in engagement with the rod.

7. In combination with coupling means between a trailer and a motor vehicle, means for applying the brakes of the trailer if the trailer moves toward the vehicle, said means including a cylinder and a piston, a second cylinder extending upwardly from the rear part of the first cylinder and a piston and spring adapted to be placed in either one of the cylinders, said parts acting to communicate the movement of the first piston to the brakes when the parts are used with mechanical brakes, and when the parts are used with hydraulic brakes the said spring and piston are placed in the upright cylinder to act as shock absorbing means.

NORMAN W. TURPIN.